(No Model.)
S. ELLIOTT.
PNEUMATIC TIRE.
No. 489,295. Patented Jan. 3, 1893.
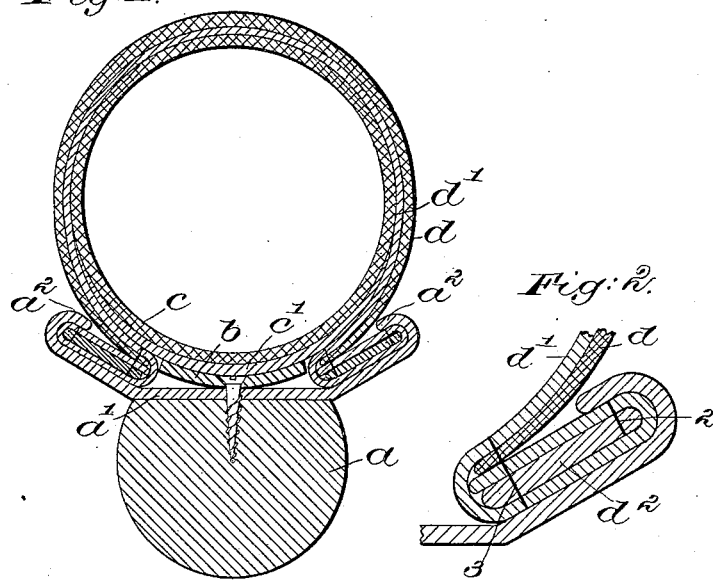
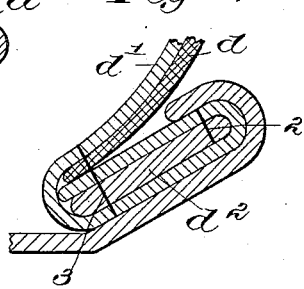
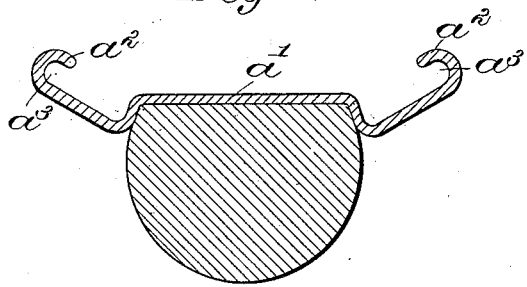
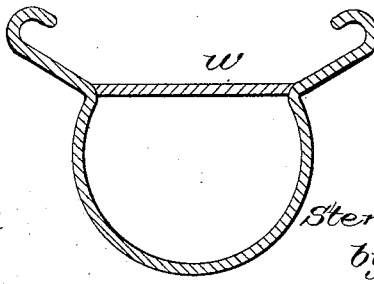
Witnesses.
Louis N. Gowell
Edward F. Allen
Inventor:
Sterling Elliott.
by Crosby & Gregory
attys.

UNITED STATES PATENT OFFICE.

STERLING ELLIOTT, OF NEWTON, MASSACHUSETTS.

PNEUMATIC TIRE.

SPECIFICATION forming part of Letters Patent No. 489,295, dated January 3, 1893.

Application filed January 11, 1892. Serial No. 417,637. (No model.)

*To all whom it may concern:*

Be it known that I, STERLING ELLIOTT, of Newton, county of Middlesex, State of Massachusetts, have invented an Improvement in Pneumatic Tires, of which the following description, in connection with the accompanying drawings, is a specification, like letters and figures on the drawings representing like parts.

This invention has for its object to improve the construction of pneumatic tires, whereby the expansible core may be easily repaired at any time, as for instance on the road. In accordance with this invention the expansible core is placed on and attached to a rim or felly, and a detachable tread face is provided which incloses the expansible core, and which is connected detachably, to the rim or felly. The detachable tread face is composed of a rubber strip secured to a canvas or other textile or suitable non-elastic yet flexible backing strip, and the edges of said textile strip are secured to or wrapped around strips of thickened material, such as sole leather, and the rim or felly which supports the core is formed or provided with hooked side portions which engage the said edges, they being held therein by the expanded core.

Figure 1, shows a vertical section of the pneumatic tire embodying this invention. Fig. 2, an enlarged sectional view of the means employed for holding the detachable tread face. Fig. 3, a sectional view showing the manner of connecting the edge of the parts of the detachable tread face, to be referred to. Figs. 4 and 5 modifications to be referred to.

The felly $a$, of wood or other suitable material, may be of any shape desired in cross section. A metallic rim $a'$ is secured to the felly $a$, by screws, or otherwise, it having at its opposite outwardly-extended edges inwardly-turned flanges $a^2$, $a^2$, to thereby form recesses $a^3$, $a^3$ at each edge, and present hooked side portions. A band $b$, of leather or other suitable material, is secured to the metallic rim $a'$ as by the same screws which secure the rim to the felly. An expansible core $c$ composed of a tube of rubber, is cemented or otherwise secured to a foundation strip $c'$, of leather or other suitable material, said leather foundation strip contacting with the leather band $b$. The strip $c'$ is chamfered at the edges as shown. This rubber core $c$ is adapted to be filled and expanded with air in any usual or suitable manner.

As it is desired to make the tread face of the tire as light as possible and yet at the same time give it the required strength and durability, I have cemented or otherwise secured a piece of rubber, as $d$, to a backing of canvas or other textile or strong material $d'$. The edges of the canvas backing $d'$ are extended beyond the edges of the rubber $d$, and said canvas edges are wrapped around narrow clips or strips $d^2$ of sole leather or other strong and rather stiff yet pliable material, and when so wrapped around, the strips $d^2$ are secured thereto by two lines of stitches, as 2, 3, one line of stitches, as 2 for instance, passing through the canvas $d'$ and through the strip $d^2$, while the other line of stitches, as 3, passes through the canvas at three points, and through the strip $d^2$, and also through the edge of the rubber tread face $d$, see Fig. 2. The clips or strips $d^2$ represented as embraced by the canvas $d'$, are, together with the canvas, of the proper thickness to enter snugly the spaces $a^3$ left by turning the edges of the rim $a'$ outwardly or away from the center of the wheel or its hub, and then inwardly as in Figs. 2 and 3 to form the hooks $a^2$. Holding the canvas and clips as shown leaves the inner edges of the clip removed for some little distance beyond the ends of the hooks $a^2$ so that as the tire yields in use, neither it nor the tread face $d$ is bent over and so as to come in contact with the hooks $a^2$, and thereby wear the said tread-face, as would be the case if the hooks $a^2$ were made longer and extended in toward the screw holding the rim to the felly for substantially the distance that the free end of the canvas $d'$ is extended toward the center of the rim. The clips, due to the stiffness of the leather of which they are composed, yield to a limited extent at their inner edges nearest the longitudinal center of the rim. The rubber strip $d$ having the canvas back $d'$ and the clips $d^2$, does not thereby constitute a detachable tread face. The central core $c$ is expanded after the tread face is placed in position with the canvas covered strips $d^2$ in the recesses $a^3$, and when the core $c$ is expanded the tread face will be found to be securely held in position by the edges of said canvas-covered strips bearing against the over-turned edges of the metallic rim, and the greater the expansive force the harder the said canvas-covered strips will bear against the said over-turned edges. It will be seen that when the tread face is placed in position on the core its outer circumference is much greater than the circumference of one of the strips $d^2$, and hence, in order to make the canvas backing conform to such difference, I full the edge of the canvas strip, as it is stitched on to the strip $d^2$, as shown in Fig. 3, thereby shortening the edges and giving full length to the central portion. If the central core $c$ should become ruptured, the detachable tread face is removed, or so much of it as desired, by removing one or both of the canvas-covered strips, or a portion thereof from the recesses $a^2$, to thereby expose the rubber core $c$, and after said core has been repaired the detachable tread face may be placed in its proper position, and the core again expanded.

By referring to Figs. 1 and 2, it will be seen that the direction of the strain on the canvas-covered strips is toward the overturned end, so that they will not be sprung out as the core is expended, and the ends $a^2$ are made shorter than the distance to the stitches 3, so as not to come in contact with them.

While I have shown the edges of the rubber strip $d$ as connected by the stitches 3 for security, it is obvious that the cement alone may suffice.

Referring to Fig. 4, the metallic rim $a'$ is so bent or formed as to obviate the necessity of employing the filling strip $b$, and in Fig. 5, the wooden felly is omitted and the metallic rim so bent or formed as to serve as the felly, the outwardly extended and overturned edges being provided to receive the canvas-covered strips, as in Fig. 1, and in this latter instance a metallic band $w$ will be provided to afford a bearing for the expansible core.

I claim—

1. In a pneumatic tire for wheels, the combination with a metallic rim, a band thereon at its central portion, an expansible core, a foundation strip as $c'$ secured thereto and connecting said core and band, and thereby holding it on said rim of a detachable tread face adapted to be connected with said rim, to inclose the core, and to be held in position by the expanded core, substantially as described.

2. In a pneumatic tire for wheels, the combination with a metallic rim, and an expansible core on and attached to it, of a tread face interlocking with said rim, and composed of a rubber surface secured to a fibrous backing, the said tread face being fulled at its edges to thereby shorten them and secured to retaining strips along said fulled portion, substantially as described.

3. In a pneumatic tire for wheels, a metallic rim having outwardly extended and inturned edges to present recesses $a^3$ and hooks $a^2$; a band $b$ between said recesses; and an expansible core $c$ mounted on a foundation $c'$; combined with a detachable tread face composed of a piece of rubber as $d$, a backing $d'$ to which it is attached, and strips $d^2$ connected to and embraced by the backing, said strips embraced by the backing entering the said recesses outside the band $b$, the expansion of the core aiding in holding the tread face in position, substantially as described.

4. In a pneumatic tire for wheels the combination with a rim and an expansible core, of a tread face fulled at its edges adjacent to said rim, substantially as described.

In testimony whereof I have signed my name to this specification in the presence of two subscribing witnesses.

STERLING ELLIOTT.

Witnesses:
BERNICE J. NOYES,
FRANCES M. NOBLE.